(12) United States Patent
Yano

(10) Patent No.: US 10,765,985 B2
(45) Date of Patent: Sep. 8, 2020

(54) AIR FILTER STRUCTURE IN GENERAL PURPOSE ENGINE

(71) Applicant: Kawasaki Jukogyo Kabushiki Kaisha, Kobe-shi, Hyogo (JP)

(72) Inventor: Takahiro Yano, Grand Rapids, MI (US)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 509 days.

(21) Appl. No.: 15/688,629

(22) Filed: Aug. 28, 2017

(65) Prior Publication Data
US 2019/0060813 A1    Feb. 28, 2019

(51) Int. Cl.
*B01D 46/24*    (2006.01)
*B01D 46/00*    (2006.01)

(52) U.S. Cl.
CPC ..... *B01D 46/2403* (2013.01); *B01D 46/0002* (2013.01); *B01D 46/0039* (2013.01); *B01D 46/0046* (2013.01); *B01D 2201/32* (2013.01); *B01D 2279/60* (2013.01)

(58) Field of Classification Search
CPC ............ B01D 46/2403; B01D 46/0046; B01D 46/0039; B01D 46/0002; B01D 2201/32; B01D 2279/60
USPC ....... 55/385.3, 337, 396, 406, 457, DIG. 28; 95/268, 271; 123/198 E
See application file for complete search history.

(56) References Cited

U.S. PATENT DOCUMENTS

| | | | | |
|---|---|---|---|---|
| 4,403,466 A | * | 9/1983 | Tillotson | F01M 11/0408 123/196 S |
| 5,228,536 A | * | 7/1993 | Mohns | F01M 11/0408 123/196 R |
| 5,231,956 A | * | 8/1993 | Lux | B27B 17/00 123/198 E |
| 5,233,946 A | * | 8/1993 | Yamami | A47L 5/14 123/41.63 |
| 5,363,815 A | * | 11/1994 | Pretzsch | F01P 5/06 123/198 E |
| 5,908,337 A | * | 6/1999 | Mashiko | F02M 35/167 440/88 R |
| 5,975,157 A | * | 11/1999 | Ashford | F01M 11/0408 141/346 |
| 6,006,703 A | * | 12/1999 | Nakamura | F04D 29/281 123/41.65 |
| 6,145,623 A | * | 11/2000 | Cordes | F16N 33/00 184/1.5 |
| 6,314,922 B1 | * | 11/2001 | Zimmermann | B25F 5/008 123/41.56 |

(Continued)

*Primary Examiner* — Minh Chau T Pham

(57) ABSTRACT

A cleaner casing is fitted to a fan casing for covering an air cooling fan for an engine. A cleaner chamber is formed between the fan casing and the cleaner casing. The cleaner chamber accommodates therein a cylindrical filter element. The filter element purifies air which will becomes an intake air for the engine. In an outer periphery of the cleaner chamber, a swirling passage is formed. An air outside the fan casing is captured into the switching passage through a suction opening. The swirling passage allows the air to be passed onto a hollow portion of the filter element after the air has been swirled around the filter element thereby.

14 Claims, 10 Drawing Sheets

(56) References Cited

U.S. PATENT DOCUMENTS

| | | | | |
|---|---|---|---|---|
| 6,523,508 B2* | 2/2003 | Husges | F01P 5/02 | 123/41.65 |
| 6,761,136 B2* | 7/2004 | Ohsawa | F01P 1/02 | 123/41.56 |
| 6,889,635 B2* | 5/2005 | Geisheker | F01P 1/02 | 123/41.65 |
| 6,948,457 B2* | 9/2005 | Maier | F01P 1/02 | 123/41.65 |
| 7,361,201 B2* | 4/2008 | Nakagome | B01D 46/008 | 55/385.3 |
| 7,363,885 B2* | 4/2008 | Miyake | F01P 1/02 | 123/185.3 |
| 7,594,484 B2* | 9/2009 | Lavender | F01P 5/06 | 123/198 E |
| 7,753,980 B2* | 7/2010 | Kobayashi | F02M 35/0203 | 55/315 |
| 8,277,528 B2* | 10/2012 | Umemoto | A01D 34/82 | 55/385.3 |
| 8,394,158 B2* | 3/2013 | Shimomura | F02M 35/0203 | 55/385.3 |
| 8,517,146 B2* | 8/2013 | Drew | F16L 55/1155 | 138/89 |
| 8,617,279 B2* | 12/2013 | Schlesinger | F02M 35/02 | 123/198 E |
| 8,683,973 B2* | 4/2014 | Raasch | F02F 1/4235 | 123/184.21 |
| 8,752,533 B2* | 6/2014 | Schultz | F02M 25/06 | 123/572 |
| 2005/0086918 A1* | 4/2005 | Honisch | F02M 35/024 | 55/498 |
| 2005/0133305 A1* | 6/2005 | Okada | B25J 19/0062 | 184/65 |
| 2009/0307890 A1* | 12/2009 | Tamamoto | F02M 35/0203 | 29/402.08 |
| 2015/0337778 A1* | 11/2015 | Wagner | B01D 46/0047 | 55/385.3 |
| 2015/0345438 A1* | 12/2015 | Finn | F02M 35/02416 | 55/480 |

* cited by examiner

AIR FILTER STRUCTURE IN GENERAL PURPOSE ENGINE

BACKGROUND OF THE INVENTION

1. Field of the Invention

The present invention relates to an air filter structure in a general purpose engine such as an air cooled engine used in, for example, a wheeled lawn mower.

2. Description of Related Art

In a general purpose engine used in, for example, the wheeled lawn mower or the like, it is generally known to use an air filter structure for filtering air to be supplied to the engine. (In this respect, see, for example, the Japanese Laid-open Patent Publication No. 63-045423.) According to the Japanese Laid-open Patent Publication No. 63-045423 referred to above, an air filter is accommodated within a fan casing, and a portion of the air compressed by an air cooling fan is sucked into the air filter as an engine intake air. Accordingly, prevention is made to avoid laterally outward protrusion of the air filter from the engine main body.

However, where air from the air cooling fan is sucked, the amount of dusts such as, for example, grasses sucked increases and, therefore, clogging of an element may develop into a serious problem. In view of demands for the suppression of the clogging, increasing of the engine output or the like, a centrifugal air filter having a high intake efficiency has come to be increasingly employed. The centrifugal air filter referred to above makes use of a cylindrical filter element and is therefore apt to become bulky in size. For this reason, it is difficult to allow the centrifugal air filter to be accommodated in the fan casing.

Although such a design that the air filter is separately provided on a lateral outside of the fan casing is available, the provision of the air filter on the lateral outside results in protrusion of the air filter from the engine to render the structure as a whole to be bulky in size.

SUMMARY OF THE INVENTION

In view of the fore going, the present invention is intended to provide an air filter structure for a general purpose engine which is effective to suppress increase in size while the clogging of the element is suppressed.

In order to accomplish the foregoing object, the present invention provides an air filter structure for a general purpose engine, which includes: a fan casing for covering an air cooling fan for the engine; a cleaner casing fitted to the fan casing for defining a cleaner chamber therebetween; a filter element of a cylindrical configuration accommodated within the cleaner chamber for purifying air which will be used as an engine intake air; and a swirling passage defined in an outer periphery of the filter element within the cleaner chamber for passing the air into a hollow portion of the filter element while the air is swirled around the filter element, in which case a suction opening is provided for introducing air outside the fan casing into the swirling passage.

According to the foregoing structure designed in accordance with the present invention, the cleaner chamber is formed between the fan casing and the cleaner casing fitted to the fan casing, and the cylindrical filter element is accommodated within the cleaner chamber. Accordingly, in spite of the use of the centrifugal air filter, an undesirable increase in the size of the engine can be suppressed. Also, since the air outside the fan casing is introduced into the swirling passage, the amount of dusts sucked is rendered to be small as compared with the case exhibited when air from the air cooling fan is sucked. Also, the use of the centrifugal air filter makes it possible to separate the dusts by the effect of the swirling flow and, therefore, a possible clogging of the filter element can be suppressed.

In the present invention, the engine referred to above may be a vertical two cylinder engine, and the filter element may be, when viewed a planar view, disposed between a pair of cylinder heads. According to this feature, the filter element can be disposed with the utilization of a space defined between the pair of the cylinder elements. Accordingly, the undesirable increase of the size of the engine can be further suppressed.

In the present invention, the suction opening referred to above may be oriented downwardly. According to this feature, it is difficult to suck the dusts around the engine. Hence, the undesirable clogging of the filter element can be furthermore suppressed.

Where the suction opening is oriented downwardly, the use may further be made of a screen fitted to the suction opening for removing foreign matter and an introducing passage formed outside the cleaner chamber for introducing the air, which has passed through the screen, into one end portion of the cleaner chamber and then providing the air with swirling flow. According to this feature, since the suction opening is oriented downwardly, the foreign matter removed by the screen can be easily fallen downwards. Accordingly, it is possible to prevent the screen from being closed. Also, since the swirling flow can be arisen within the introducing passage, separation of the dusts can be facilitated within the swirling passage. As a result, the clogging of the filter element can be further suppressed.

In the present invention, the use may be made of a first guide member used to retain one end portion of the cylindrical filter element from radially outwards to form a portion of the swirling passage in an outer periphery of the end portion of the filter element and a second guide member used to retain the other end portion of the filter element from radially outwards to form a portion of the swirling passage in an outer periphery of the other end portion of the filter element. According to this structural feature, the air can be smoothly guided from one end portion to the other end portion of the filter element within the swirling passage. Thereby, the separation of the dusts by the action of the swirling flow can be accelerated and the undesirable clogging of the filter element can be further suppressed.

Where the first and second guide members are used, the first guide member may include a pipe formed integrally with one of the fan casing and the cleaner casing with one end portion of the filter element inserted into the pipe in an axial direction of the filter element, while the second guide member may include a pair of guide pieces fitted respectively to the fan casing and the cleaner casing, the guide pieces supporting the other end portion of the filter element from a radial direction of the filter element. According to this structural feature, selective removal and mounting of the filter element can be facilitated and, therefore, maintenance can be improved.

In the present invention, the fan casing may have a fan casing side mating surface defined therein and the cleaner casing may have a cleaner casing side mating surface defined therein, the fan casing and the cleaner casing contacting with each other at an butting area between the fan casing side mating surface and the cleaner casing side mating surface, in which case a projection is formed in one of the fan casing side mating surface and the cleaner casing side mating surface, and a groove engageable with the projection is formed in the other of the fan casing side mating surface and the cleaner casing side mating surface. According to this feature, engagement between the projection and the groove is effective to prevent the air from being sucked through the mating surfaces. Also, when a stripe shaped sealing member is engaged in this groove, suction of the air can be further suppressed. Accordingly, a stabilized swirling flow of the air can be obtained within the swirling passage.

In the present invention, the air referred to above may flow within the cleaner chamber from one end portion towards the opposite end portion of the cleaner chamber, and a dust discharge opening for discharging dusts within the cleaner chamber into a discharge passage may be formed axially outwardly of the filter element at the other end portion of the cleaner chamber. According to this structural feature, from the dust discharge opening which is defined in a portion where the swirling air is decelerated, the dusts can be efficiently discharged. As a result thereof, the dust will no longer be accumulated within the cleaner chamber and, therefore, the clogging of the filter element can be further suppressed.

Where the dust discharge opening is formed as referred to above, the dust discharge opening may have an upstream edge, which is positioned on an upstream side of the air discharged from the dust discharge opening, and a downstream edge positioned on a downstream side thereof, in which case the upstream edge and the downstream edge both may extend in an axial direction of the filter element, while the downstream edge may be positioned above the upstream edge. According to this structural feature, it is possible to prevent an undesirable reverse flow of the dust from the dust discharge passage.

Where the dust discharge opening is formed as discussed above, the use may be made of a dust discharge pipe fluid connected with the dust discharge opening, the dust discharge pipe forming the dust discharge passage therein, and a one-way valve may be fitted to an outlet of the dust discharge pipe.

According to this structural feature, the reverse flow of the dusts can be avoided by the use of this one-way valve. Also, the dusts can be gradually discharged from the one-way valve while the dusts are accumulated within the dust discharge pipe. In view of this, the operation of the one-way valve can be stabilized. In such case, the one-way valve may have an outlet opening oriented downwardly. According to this structural feature, since the dust falls from the outlet of the one-way valve by the effect of its own weight, the discharge capability of the dusts improves.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
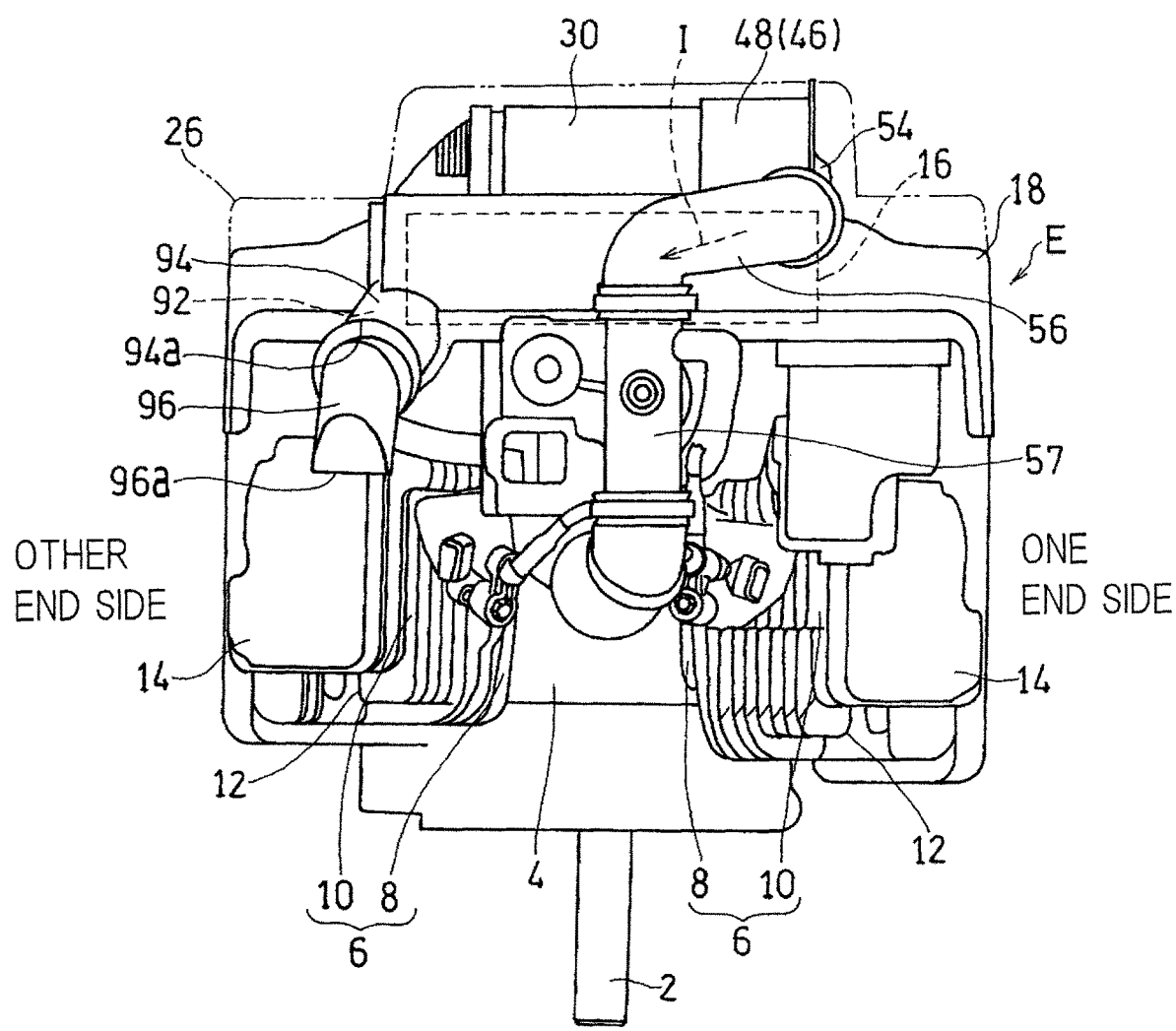
FIG. 1 is a front elevational view showing a general purpose engine provided with an air filter structure designed in accordance with a preferred embodiment of the present invention.
Figure 2:
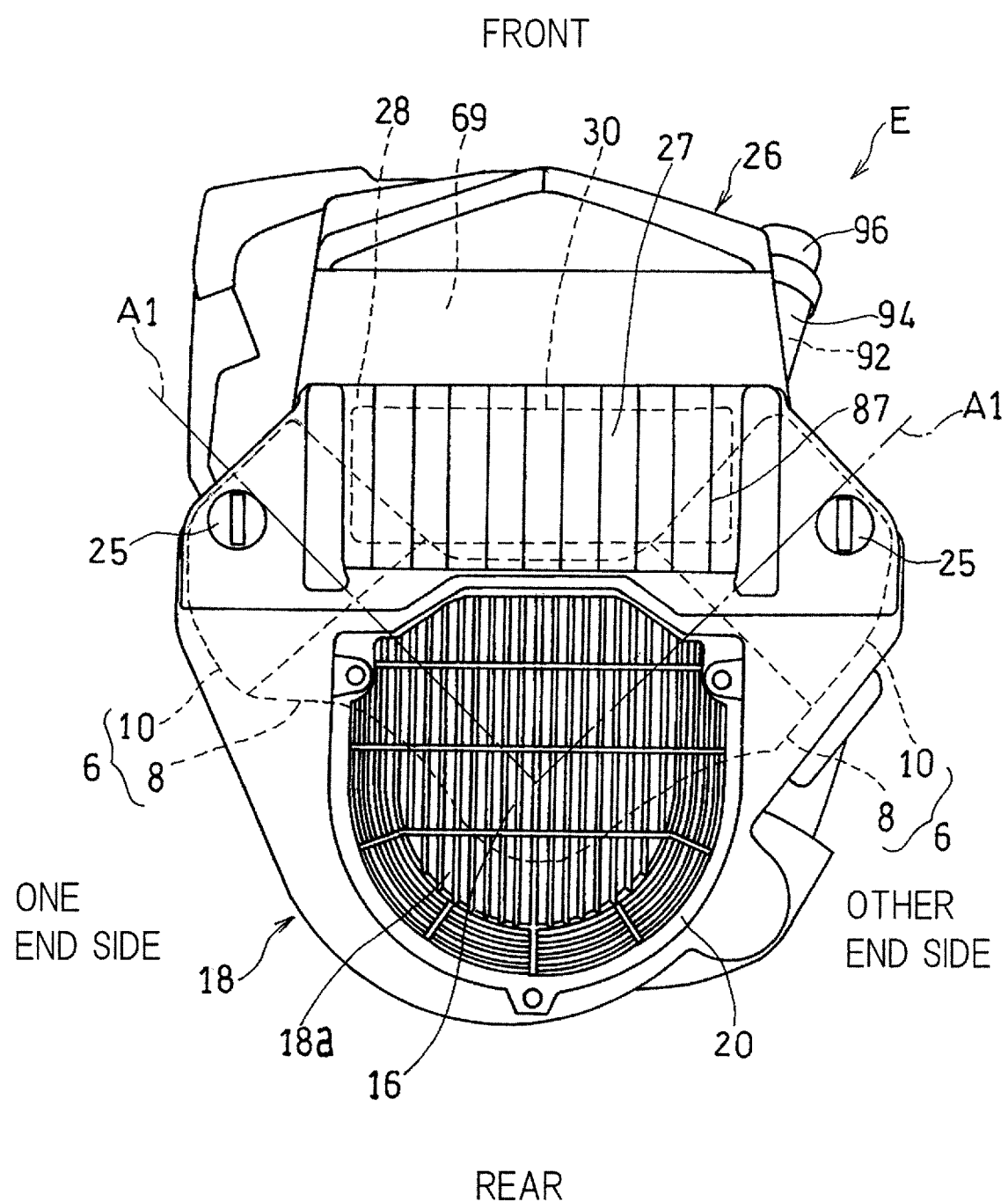
FIG. 2 is a top plan view showing the general purpose engine.

A preferred embodiment of the present invention will be described in detail with reference to the accompanying drawings. In particular, FIG. 1 illustrates a front elevational view of a general purpose engine having the air filter structure designed in accordance with the preferred embodiment of the present invention, and FIG. 2 is a top plan view thereof. The engine E employed in the practice of the preferred embodiment of the present invention is an air cooled vertical two cylinder engine of a kind which may be used as a drive source in a wheeled brushing machine. It is, however, to be noted that the type of the engine E to which the present invention can be applied is not necessarily limited to that described above. The engine E employed in the practice of the preferred embodiment includes a crankshaft 2 which is a rotary drive shaft that extends in a vertical direction (an upward and downward direction), a crankcase 4 for supporting the crankshaft 2 and a pair of cylinder units 6 and 6 that protrude forwards from a front portion of the crankcase 4. The crankshaft 2 has a lower end portion to which a work tool such as, for example, a brush cutting blade, is fitted.

Each of the cylinder units 6 has a cylinder 8 connected with the crankcase 4 and a cylinder head 10 connected with a front end of the cylinder 8. As shown in FIG. 2, a cylinder axial line A1 in each of the cylinder units 6 extends forwardly towards an outer side while having been inclined. In other words, the cylinder axial lines A1 in the two cylinder units 6 forms a V shape opening forwardly.

As shown in FIG. 1, cooling fins 12 are formed in an outer periphery of the cylinder unit 6. By those cooling fins 12, the surface area is increased to enhance the cooling effect of the air cooled engine. The cylinder unit 6 has a front end to which a head covering 14 is fitted.

Figure 3A:
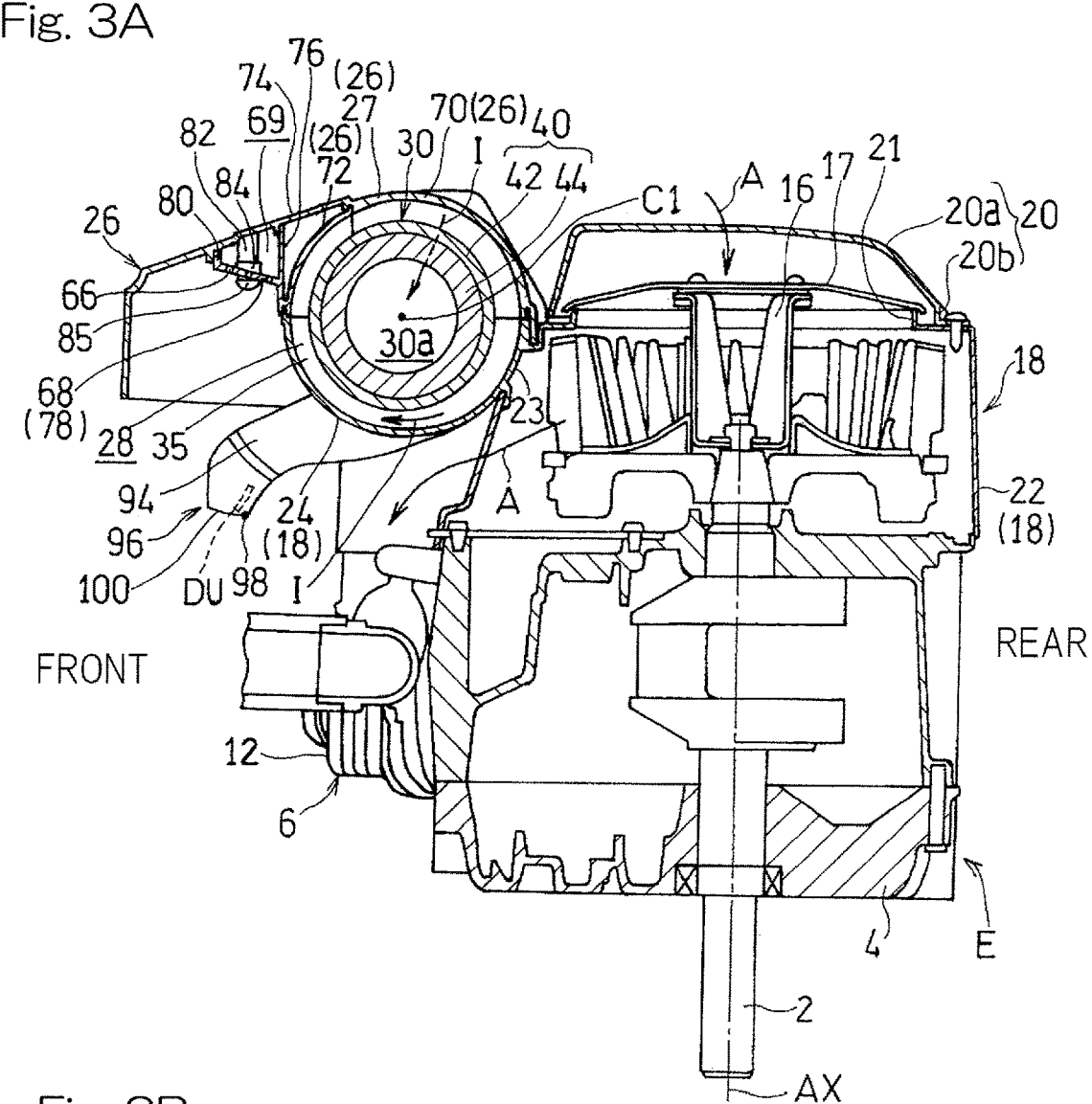
FIG. 3A is a longitudinal sectional view of the general purpose engine.
Figure 5:
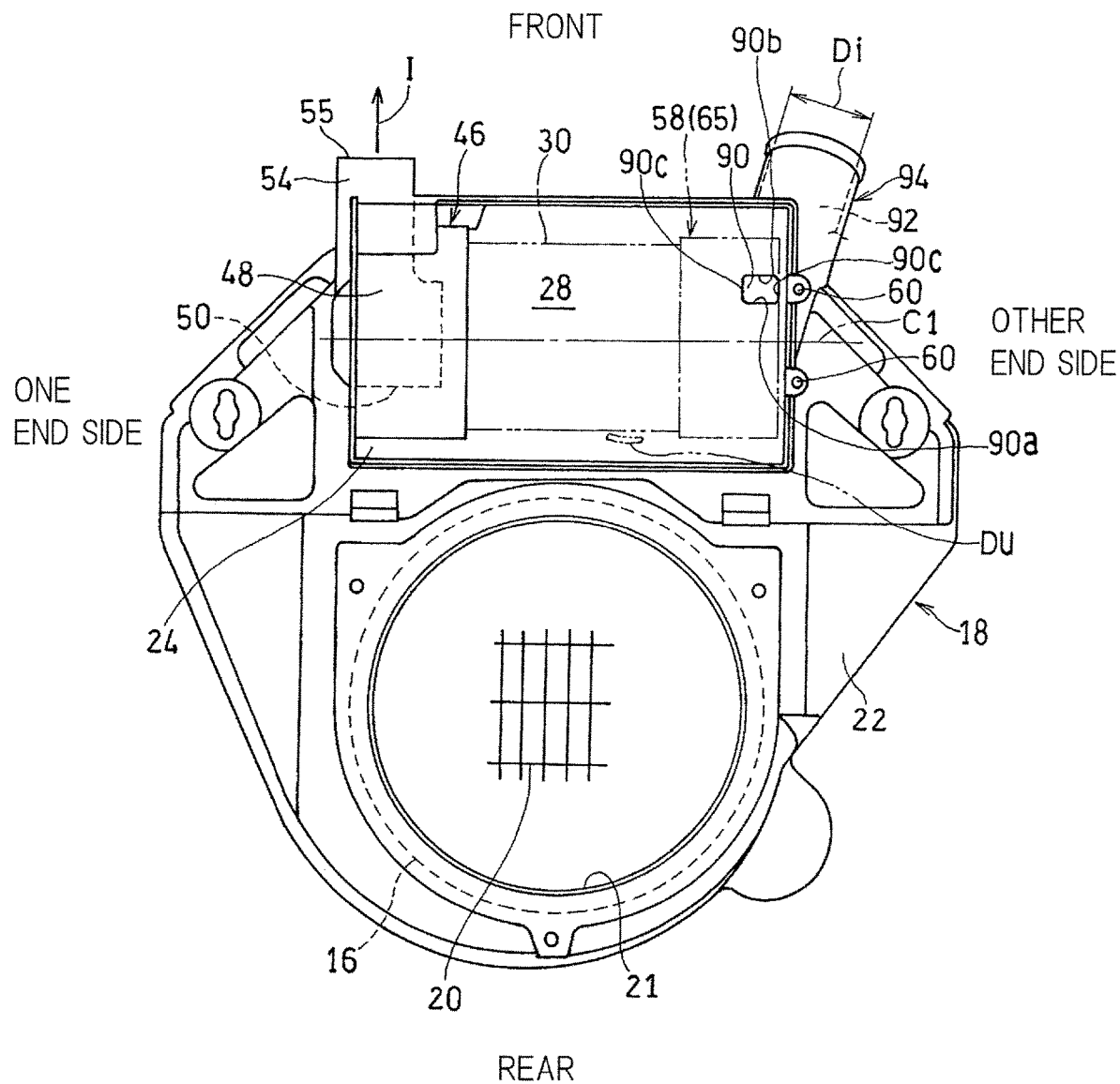
FIG. 5 is a top plan view showing a fan casing for the general purpose engine.

As shown in FIG. 3A, an air cooling fan 16 is fitted to an upper end of the crankshaft 2. A rotary screen 17 is fitted to an upper end of the air cooling fan 16. The crankcase 4 has an upper end portion to which a fan casing 18 is fitted. As shown in FIG. 5, the fan casing 18 includes a fan housing portion 22 for covering the air cooling fan 16 and an element accommodating portion 24 positioned on a front side of the fan housing portion 22. The fan casing 18 is in the form of a die formed product made of a resinous material and, hence, the fan housing portion 22 and the element accommodating portion 24 both referred to above are formed integrally with each other.

As shown in FIG. 3A, the fan housing portion 22 in the fan casing 18 covers an outer periphery of the air cooling fan 16 except for a forward area thereof and an upper area of the air cooling fan 16. The forward area of the air cooling fan 16 is covered by a portion (rear wall 23) of the element accommodating portion 24.

A cooling air intake opening 21, which opens upwardly, is formed in the fan housing portion 22 of the fan casing 18. The rotary screen 17 referred to above is disposed above the cooling air intake opening 21. A fan covering 20 is fitted to an upper surface of the fan housing portion 22, and this fan covering 20 serves to cover both of the cooling air intake opening 21 and the rotary screen 17 from above. The fan covering 20 includes a screen member 20a of a grid configuration and a frame portion 20b that defines an outer peripheral edge of the screen member 20a. In other words, an air A flows into the fan casing 18 after having passed through the screen member 20a in the fan covering 20, but foreign matter larger in size than the mesh size of the screen member 20a is incapable of being passed therethrough.

When the crankshaft 2 rotates incident to the start of the engine E, the air cooling fan 16 and the rotary screen 17 are also rotated together with the crankshaft 2. Upon rotation of the air cooling fan 16 in this way, the air A is sucked into the fan casing 18 by way of the cooling air intake opening 21. The air A so introduced into the fan casing 18 is guided by the fan casing 18 so as to flow downwards, and components to be cooled such as, for example, the cylinder units 6 and 6 are hence cooled. Grasses or the like, which are small in size than the mesh size of the screen member 20a, may pass through the fan covering 20. These grasses are finely cut by the rotary screen 17 and are then discharged to the outside through a gap delimited between the crankcase 4 and the fan casing 18.

The element accommodating portion 24 of the fan casing 18 represents a semicylindrical shape while opening upwardly. A center axis Cl of the element accommodating portion 24 of the semicylindrical shape extends in a widthwise direction that is perpendicular to the axis AX of the crankshaft 2.

A cleaner casing 26 is fitted to the fan casing 18. More specifically, the cleaner casing 26 is removably fitted to an upper surface of the fan casing 18 by means of fixture pieces 25 (best shown in FIG. 2). In the practice of the embodiment now under discussion, the cleaner casing 26 is employed in the form of a die formed product made of a resinous material. This cleaner casing 26 includes an element covering portion 27 of a downwardly opened semicylindrical shape. The element covering portion 27 of the semicylindrical shape is coaxial (center axis C1) with the element accommodating portion 24 and has a radius that is set to be equal to the radius of the element accommodating portion 24.

Figure 6:
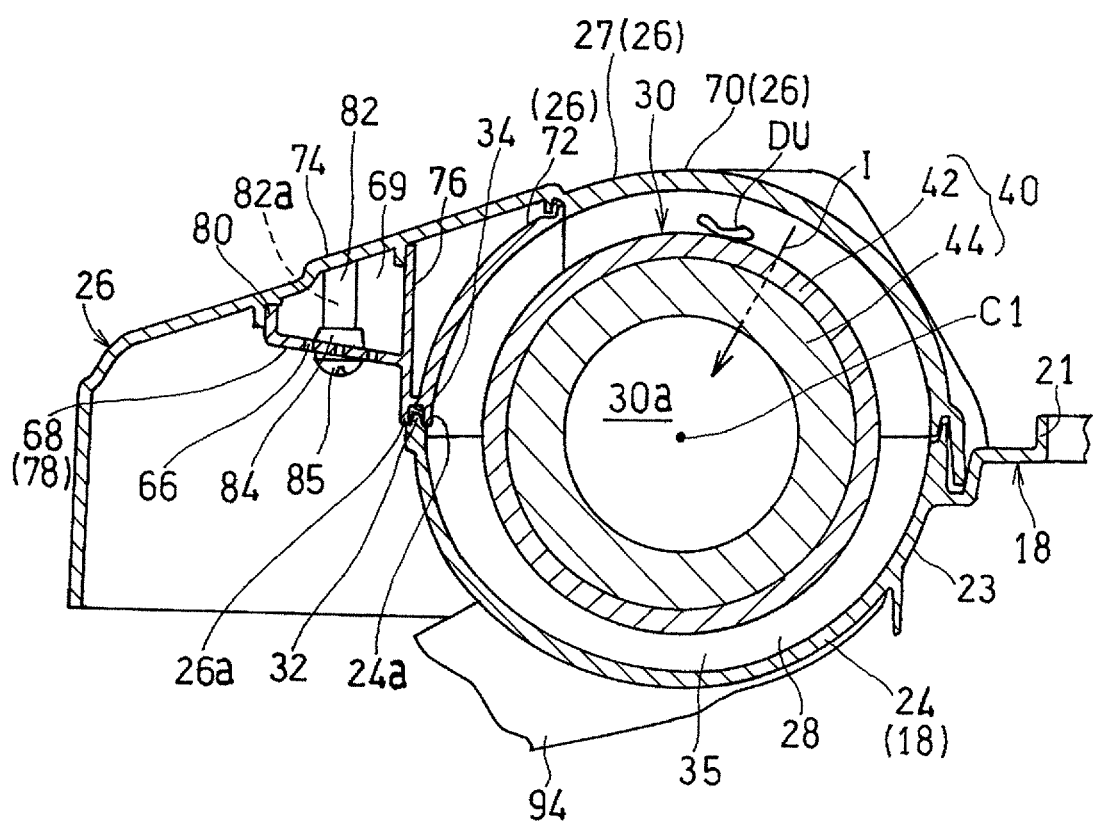
FIG. 6 is a longitudinal sectional view showing the fan casing and the cleaner casing.

In other words, as shown in FIG. 6, the cylindrical shape with its center axis indicated by C1 is defined when two end surfaces 24a of the element accommodating portion 24 of the fan casing 18 and two end surfaces 26a of the element covering portion 27 of the cleaner casing 26 are mated together. An interior space defined within this cylinder forms a cleaner chamber 28. In other words, the cleaner chamber 28 is formed between the element accommodating portion 24 of the fan casing 18 and the element covering portion 27 of the cleaner casing 26. The cleaner casing 26 has an upper surface lying at the substantially same height as an upper surface of the fan covering 20.

The cleaner chamber 28 and the interior space in the fan housing portion 24 of the fan casing 18 are divided from each other by the rear wall 23 referred to above. In other words, the air A induced by the air cooling fan 16 does not flow into the cleaner chamber 28.

An end surface 24a of the element accommodating portion 24 of the fan casing 18 forms a fan casing side mating surface 24a at a butting area between the fan casing 18 and the cleaner casing 26. On the other hand, an end surface 26a of the element covering portion 27 of the cleaner casing 26 forms a cleaner casing side mating surface 26a at the butting area between the fan casing 18 and the cleaner casing 26. This butting area extends over the entire periphery of the element accommodating portion 24 except for connecting areas of fastening members 64 as will be described later.

An upwardly protruding projection 32 is formed in the fan casing side mating surface 24a. On the other hand, an upwardly recessed groove 34 is formed in the cleaner casing side mating surface 26a. When the projection 32 is engaged in the groove 34, the sealability of the cleaner chamber 28 is increased. It is to be noted that the projection 32 may be engaged in the groove 34 after a stripe sealing member has been mounted in the groove 34. The sealing member referred to above may be made from, for example, a urethane sponge. With the sealing member employed, the sealability of the cleaner chamber 28 is further increased. It is also to be noted that the groove 34 may be formed in the fan casing side mating surface 24a and the projection 32 may be provided in the cleaner casing side mating surface 26a.

Figure 4:
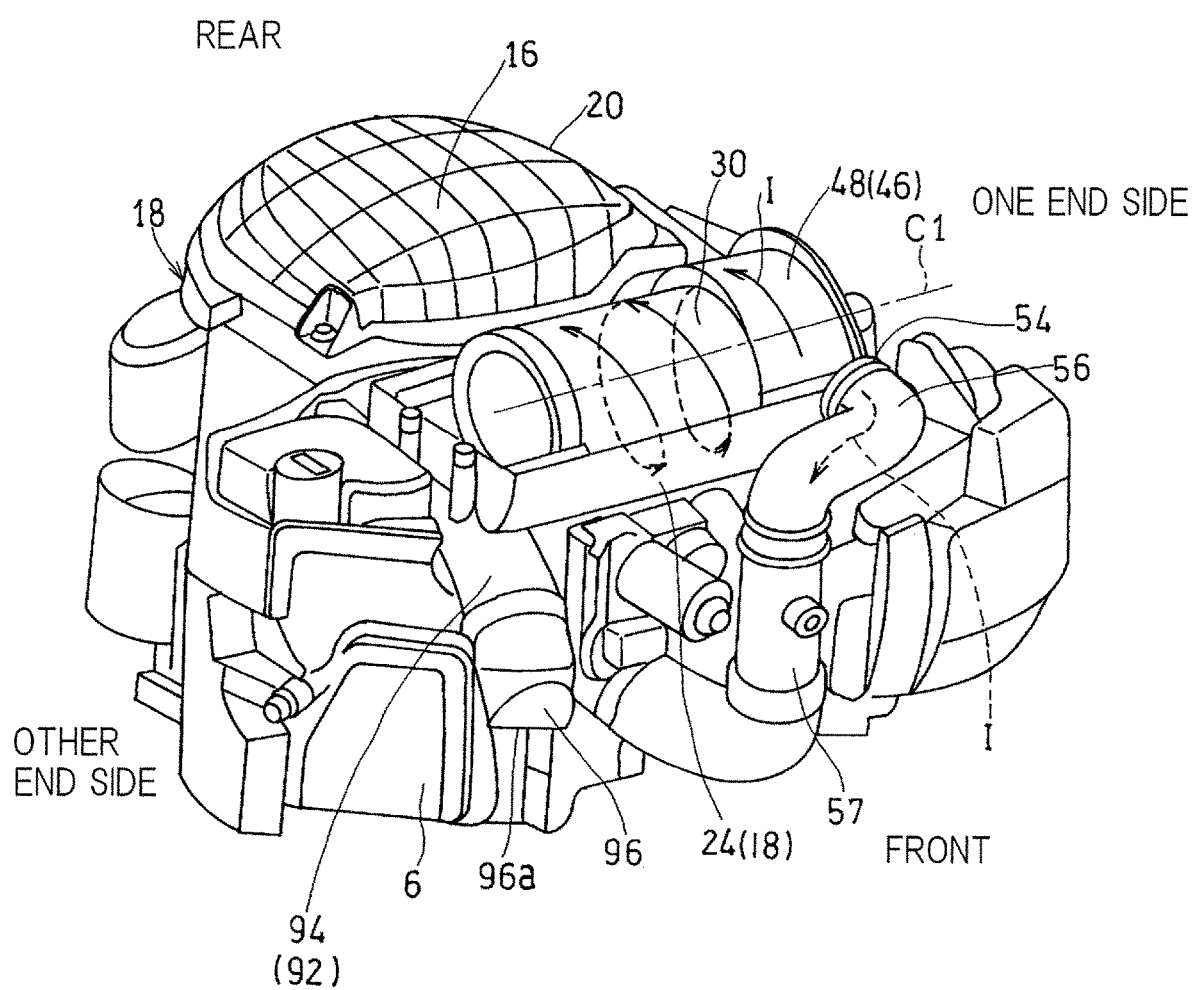
FIG. 4 is a perspective view showing a condition in which a cleaner casing for the general purpose engine has been removed.

The cleaner chamber 28 has an cylindrical filter element 30 accommodated therein. A swirling passage 35 is formed in an outer periphery of the filter element 30 within the cleaner chamber 28. This swirling passage 35 is formed between an outer peripheral surface of the filter element 30, and an inner peripheral surface of the element accommodating portion 24 and between the outer peripheral surface of the cylindrical filter element 30 and an inner peripheral surface of the element covering portion 27 of the cleaner casing 26. As shown in FIG. 4, the air, which will eventually form an intake air I for the engine E, flows in a direction towards the center axis C1 while swirling within the swirling passage 35. The intake air I flows within the swirling passage 35 from one side (a right side as viewed in FIG. 4) towards the other side (a left side as viewed in FIG. 4).

As shown in FIG. 3A, the filter element 30 is disposed upwardly of the cylinder head 10. Viewing a top plan view of FIG. 2, a major portion of the filter element 30 except for portions thereof at opposite ends is so disposed as to assume a position between the pair of the cylinder heads 10 and 10.

Figure 7:
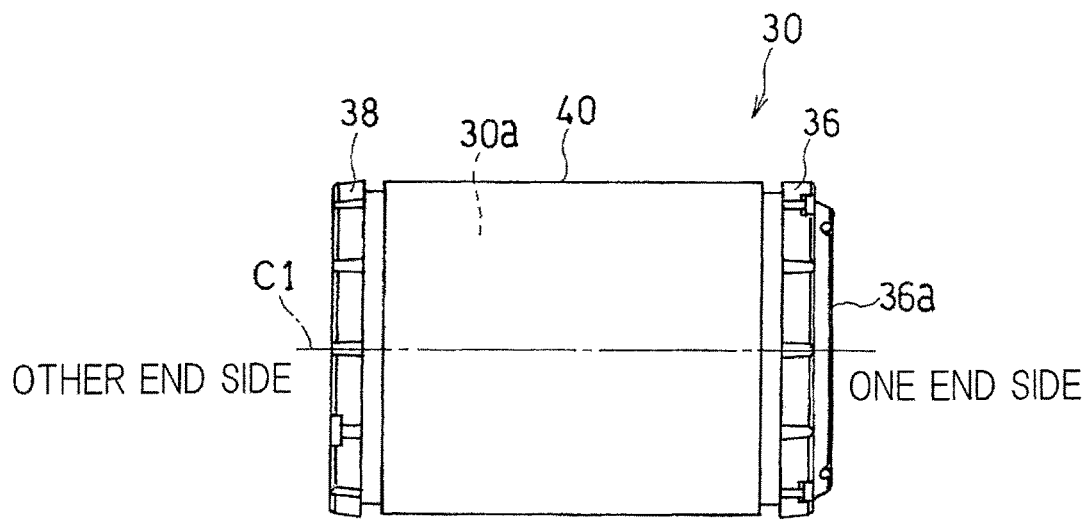
FIG. 7 is a front elevational view showing a filter element for the general purpose engine.
Figure 8:
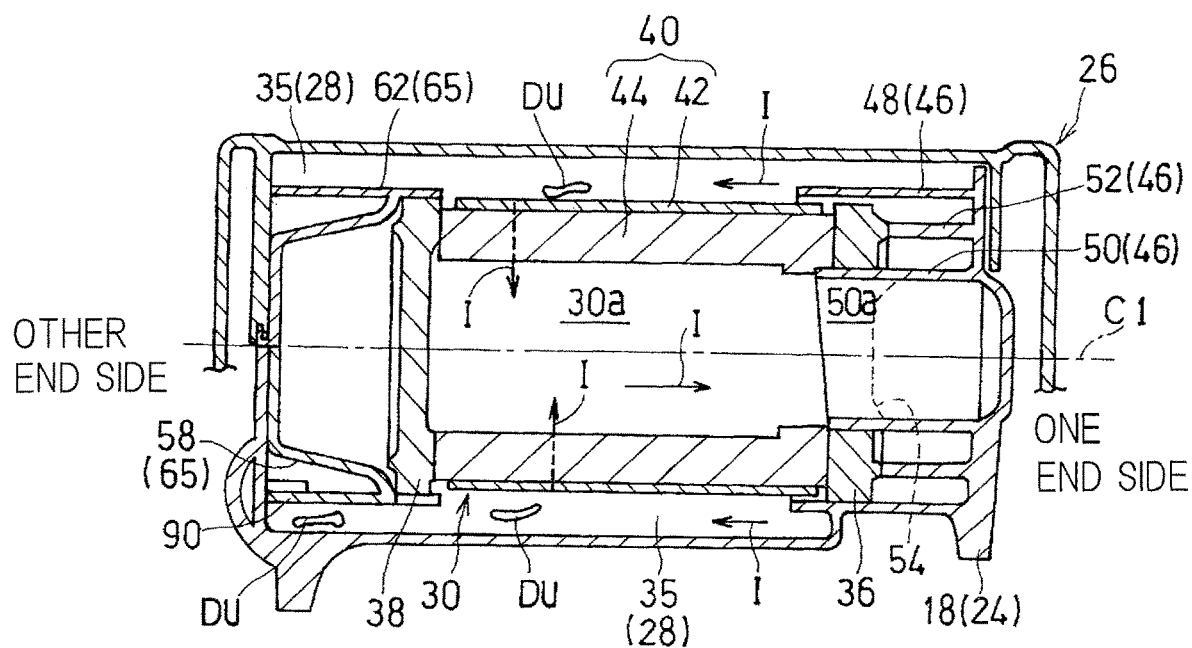
FIG. 8 is a longitudinal sectional view showing the fan casing and the cleaner casing cut along a center axis.

The filter element 30 purifies the intake air I for the engine E. This filter element 30 includes, as shown in FIG. 7, first and second retaining portions 36 and 38 at axially opposite ends thereof and a filter portion 40 between the first and second retaining portions 36 and 38. The first retaining portion 36 is defined in one end portion (a right side as viewed in FIG. 7) of the filter element 30 whereas the second retaining portion 38 is defined in the other end portion (a left side as viewed in FIG. 7) thereof. In the practice of the embodiment now under discussion, each of the first and second retaining portions 36 and 38 is made of a resinous material. As shown in FIG. 8, the first retaining portion 36 has an end surface left opened whereas the second retaining portion 38 has an end surface closed. In other words, a hollow portion 30a of the filter element 30 is left opened towards one end side thereof through an opening 36a in the first retaining portion 36.

As shown in FIG. 3A, the filter portion 40 includes a primary filter 42 positioned on a radially outer side and a secondary filter 44 positioned on a radially inner side. In the practice of the embodiment now under discussion, the primary filter 42 is prepared from sponge whereas the secondary filter 44 is prepared from paper. It is, however, to be noted that the material for each of the primary and secondary filters 42 and 44 may not be necessarily limited to that described above. The intake air I flowing within the swirling passage 35 is, as the air I flows through the primary and secondary filters 42 and 44, purified and then flows into the hollow portion 30a of the filter element 30.

As shown in FIG. 5, one end portion (a left side as viewed in FIG. 5) of the fan housing portion 24 of the fan casing 18 is formed with a first guide member 46 that protrudes into the interior of the cleaner chamber 28. This first guide member 46 is of a cylindrical shape coaxial with the center axis C1 of the fan housing portion 24 and is formed integrally with the fan housing portion 24. The first guide member 46 may however be formed integrally with the element covering portion 27 of the cleaner casing 26. Specifically, as shown in FIG. 8, the first guide member 46 includes a large diameter retaining portion 48, an insertion pipe 50 of a reduced diameter and a positioning portion 52 having a diameter intermediate between the large diameter retaining portion 48 and the small diameter insertion pipe 50.

The retaining portion 48, the insertion pipe 50 and the positioning portion 52 represent a cylindrical shape coaxial with the center axis C1 of the fan housing portion 24. The length of protrusion of the retaining portion 48 as measured in a direction towards the center axis C is the largest, followed by the length of protrusion of the insertion pipe 50 and finally by the length of protrusion of the positioning portion 52. The retaining portion 48 has an inner diameter so chosen as to be equal to or somewhat larger than the outer diameter of the filter element 30. The retaining portion 48 retains the first retaining portion 36 of the filter element 30 from radially outwards. At one end side (a right side as viewed in FIG. 8) of the cleaner chamber 28, a portion of the swirling passage 35 is formed in an outer periphery of the retaining portion 48 of the first guide member 46.

The insertion pipe 50 has an outer diameter which is equal or somewhat larger than the diameter of the opening 36a in the first retaining portion 36 and is inserted inwardly along the direction of the center axis C1 into the opening 36a in the first retaining portion 36. In other words, the first retaining portion 36 of the filter element 30 is inserted into the insertion pipe 50 from the direction of the center axis C1. Accordingly, the hollow portion 30a of the filter element 30 and a hollow portion 50a of the insertion pipe 50 are communicated with each other. Also, an outer peripheral surface of the insertion pipe 50 cooperates with the inner peripheral surface of the first retaining portion 36 to define a sealing portion.

The positioning portion 52 has a projected end face with which an end surface of the first retaining portion 36 is held in contact. Accordingly, the axial position of the filter element 30 is regulated. With one end side of the insertion pipe 50, the cleaner outlet pipe 54 is connected. As shown in FIG. 5, the cleaner outlet pipe 54 extends forwards to form an outlet opening 55. The cleaner outlet pipe 54 is also formed integrally with the fan housing portion 24. The intake air I flowing into the insertion pipe 50 through the hollow portion 30a (shown in FIG. 8) of the filter element 30 is guided to the outside of the cleaner chamber 28 through the cleaner outlet pipe 54.

As shown in FIG. 4, the cleaner outlet pipe 54 is fluid connected with an air intake pipe 56. Accordingly, the intake air I guided from the cleaner outlet pipe 54 is supplied to a throttle body 57 for the cylinder units 6 and 6 by way of the air intake pipe 56.

As shown by the double dotted line in FIG. 5, a lower guide piece 58 is provided at the other end portion (a right side as viewed in FIG. 5) of the fan housing portion 24 of the fan casing 18. This lower guide piece 58 is of a hollow semi-conical configuration coaxial with the center axis C1 of the fan housing 24. This lower guide piece 58 is a member separate from the fan housing portion 24 and is removably fitted to the fan housing portion 24 with the use of fastening members 60 such as, for example, bolts.

Figure 9:
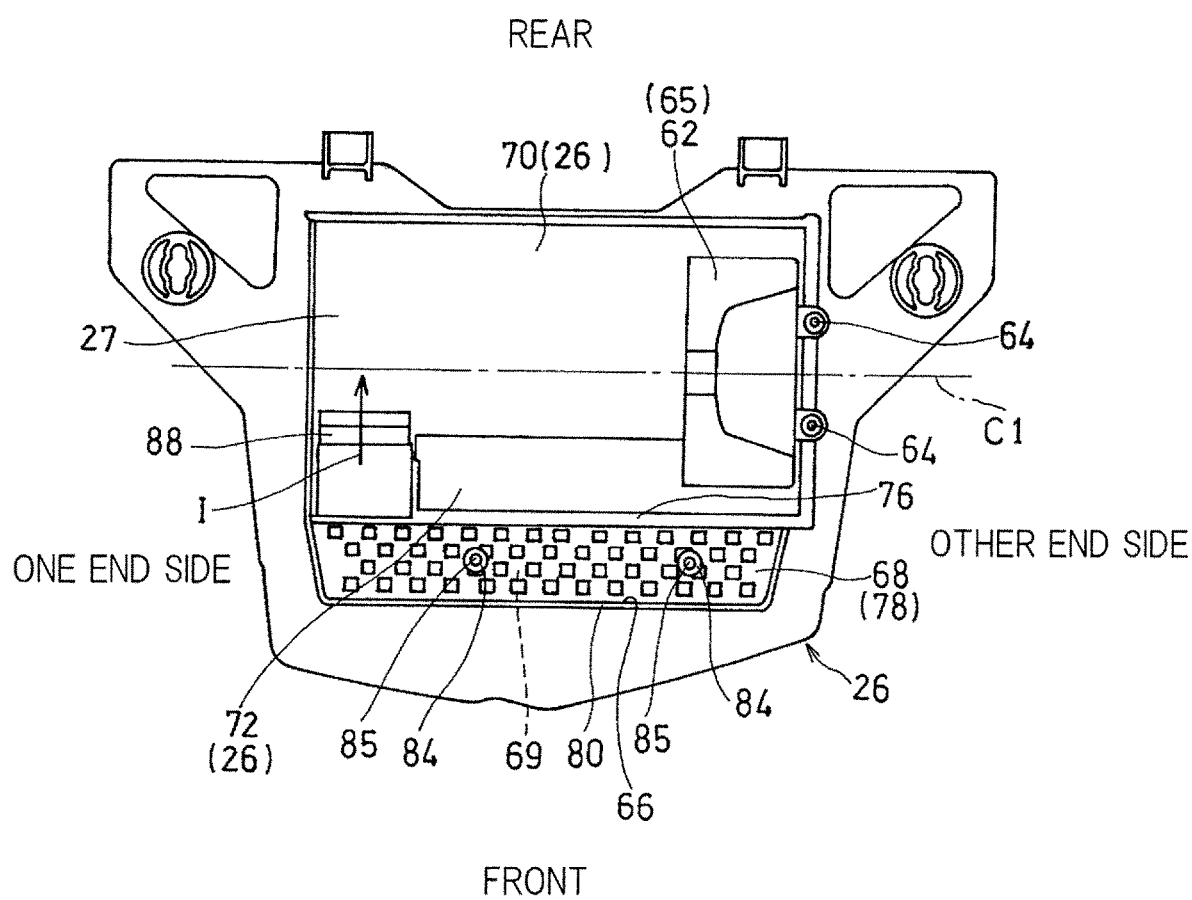
FIG. 9 is a bottom plan view showing the cleaner casing.

FIG. 9 illustrates a bottom plan view of the cleaner casing 26 as viewed from bottom. As shown in FIG. 9, the other end portion (a right side as viewed in FIG. 9) of the cleaner casing 26 is provided with an upper guide piece 62. This upper guide piece 62 is of a semicylindrical configuration coaxial with the center axis C1. This upper guide piece 62 is a member separate from the cleaner casing 26 and is removably fitted to the cleaner casing 26 with the use of fastening members 64 such as, for example, bolts.

As shown in FIG. 8, the lower guide piece 58 and the upper guide piece 62 of the semicylindrical shape cooperate with each other to form a second guide member 65 having an outer peripheral represented by a cylindrical surface. The second guide member 65 has an inner diameter so chosen as to be substantially equal to the outer diameter of the second retaining portion 38 of the filter element 30. The second guide member 65 is used to retain the second retaining portion 38 of the filter element. Specifically, the lower guide piece 58 and the upper guide piece 62 of the second guide member 65 cooperate to support the second retaining portion 38 from radially outwards. At the other end (a left side as viewed in FIG. 8) of the cleaner chamber 28, a portion of the swirling passage 35 is formed in the outer periphery of the second guide member 65.

As shown in FIG. 3A, a suction opening 66 is formed in a front portion of the cleaner casing 26. This suction opening 66 is used to allow an air outside the cleaner casing 26 to be introduced into the swirling passage 35. Specifically, the suction opening 66 introduces into the swirling passage 35 the air outside the cleaner casing 26 and also outside the fan casing 18. In the practice of the embodiment now under discussion, the suction opening 66 is oriented downwards. It is, however, to be noted that the orientation of the suction opening 66 may not be necessarily limited thereto.

A screen 68 for removing foreign matter is mounted on the suction opening 66. The screen 68 is in the form of a mesh and is capable of suppressing an undesirable intrusion of foreign matter such as, for example, grasses into the cleaner chamber 28. Since the suction opening 66 is oriented downwards, the foreign matter removed by the screen 68 falls downwardly. An introducing passage 69 is formed at an outer side of the cleaner chamber 28, specifically at a front side of the cleaner chamber 28 in the practice of the embodiment now under discussion.

The introducing passage 69 is formed between the suction opening 66 and the cleaner chamber 28. The introducing passage 69 introduces the air, which has passed across the screen 68, into one end portion of the air cleaner chamber 28 and provides such air with swirling flow. As shown in FIG. 9, the introducing passage 69 extends at a region forwardly of the cleaner chamber 28 from one end portion to the other end portion thereof.

As shown in FIG. 3A, the element covering portion 27 of the cleaner casing 26 includes a first casing piece 70 and a second casing piece 72. The first casing piece 70 forms a part ranging from a rear wall to an upper wall of the element covering 27 of the semicylindrical configuration. On the other hand, the second casing piece 72 forms a part of a front wall of the element covering portion 27 of the semicylindrical configuration.

The first casing piece 70 has an upper wall portion 74 so formed as to be in continuance therewith. The upper wall portion 74 is formed integrally with the first casing piece 70 by means of a die forming technique using a resinous material. This upper wall portion 74 extends from a front end of the element covering portion 27 inclined downwardly towards the front. The second casing piece 72 has a rear wall portion 76, a lower wall portion 78 and a front wall portion 80 all formed therein in continuation with each other. In particular, the rear wall portion 76, the lower wall portion 78 and the front wall portion 80 are formed integrally with the second casing piece 72 by means of a die forming technique using a resinous material. The rear wall portion 76 extends forwards from a lower end of the second casing piece 72 inclined downwardly towards the front, with an upper end of the rear wall portion 76 terminating in contact with a lower surface of the upper wall portion 74.

The lower wall portion 78 is branched off from the rear wall portion 76 and then extends inclined upwardly towards the front. This lower wall portion 78 forms the screen 68 hereinbefore described. The front wall portion 80 extends upwardly from a front end of the lower wall portion 78 with its upper end held in contact with a lower surface of the upper wall portion 74. Hence, the introducing passage 69 of a trapezoidal shape is formed by the upper wall portion 74, the rear wall portion 76, the lower wall portion 78 and the front wall portion 80. In the practice of the embodiment now under discussion, the introducing passage 69 has a sectional shape representing the trapezoidal shape with its lower bottom (long side) of the rear wall portion 76 and its upper bottom (short side) of the front wall portion 80. It is, however, to be noted that the shape of the introducing passage 69 may not necessarily be limited to the trapezoidal shape as discussed above.

The upper wall portion 74 extends further forwardly beyond the introducing passage 69, and covers the introducing passage 69 and the cleaner chamber 28 from front. The upper wall portion 74 is has a cylindrical first boss 82 formed therein. This first boss 82 is formed integrally with the upper wall portion 74 by means of a die forming technique. This first boss 82 extends from the upper wall portion 74 downwardly within the introducing passage 69. The first boss 82 has a hollow portion formed with a screw hole 82a.

An annular second boss 84 is formed in the lower wall portion 78. This second boss 84 is formed integrally with the lower wall portion 78 by means of a die forming technique. The annular second boss 84 has an insertion hole (not shown) formed therein. The second boss 82 is disposed at a position corresponding to the first boss 82. In other words, at the time the first casing piece 70 is assembled with the second casing piece 72, a lower surface of the first boss 82 is brought into contact with an upper surface of the second boss 84. Starting from this condition, a fastening member 85 such as, for example, a bolt is inserted into a throughhole 84a in the second boss 84 and is then threaded into the screw hole 82a in the first boss 82.

Accordingly, the first casing piece 70 and the second casing piece 72 are integrated together and the cleaner casing 26 and the introducing passage 69 are thus formed. As shown in FIG. 9, in the practice of the embodiment now under discussion, each of the first and second bosses 82 and 84 are employed two in number. It is, however, to be noted that the number of each of the first and second bosses 82 and 84 employed is not necessarily limited to two such as discussed above. As described above, with the cleaner casing 26 having been formed by those two members including the first casing piece 70 and the second casing piece 72, the introducing passage 69 can be formed simultaneously with cleaner casing 26 with the use of a die forming technique.

Figure 10:
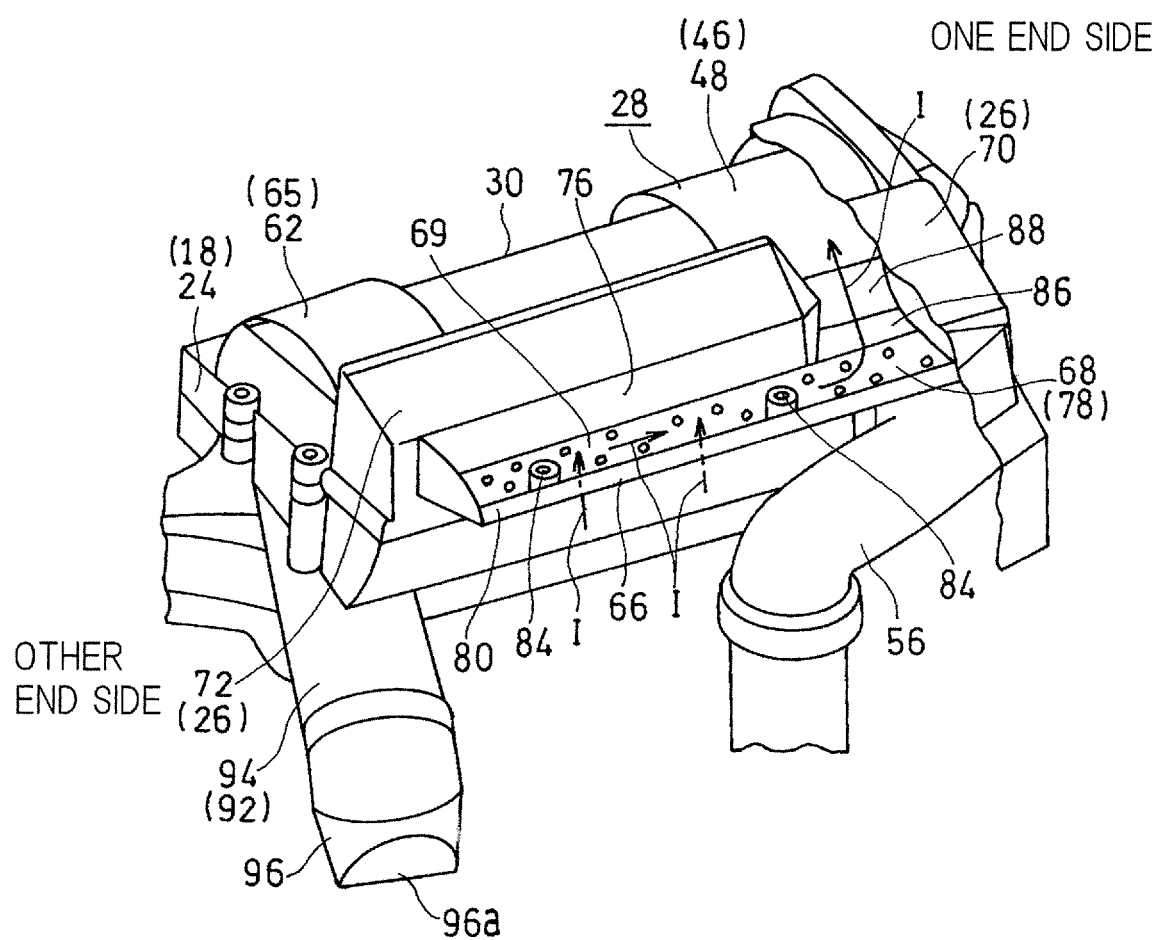
FIG. 10 is a perspective view showing a condition in which a first cleaner casing for the general purpose engine is removed.
Figure 11:
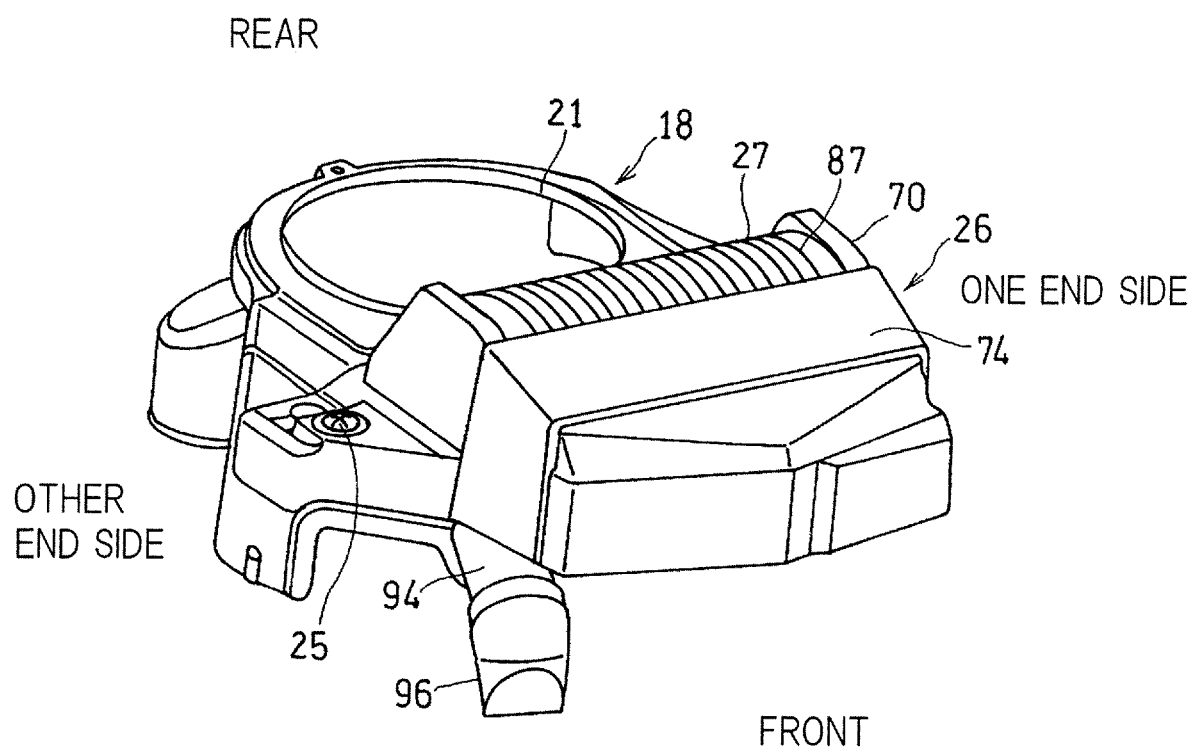
FIG. 11 is a perspective view showing the fan casing and the cleaner casing.

FIG. 10 is a perspective view showing the condition with a portion of the first casing piece 70 of the cleaner casing 26 removed. FIG. 11 is a perspective view of an assembly of the cleaner casing 26 and the fan casing 18 as viewed downwardly from diagonally above. As shown in FIG. 11, the cleaner chamber 28 has a plurality of annular reinforcement ribs 87 formed in an outer periphery of the cleaner chamber 28. As shown in FIG. 10, one end portion of the introducing passage 69 is formed with a communicating port 86 which is communicated with one end portion of the cleaner chamber 28. This communicating port 86 is provided with a slope 88. In the practice of the embodiment now under discussion, the slope 88 is formed integrally with the second casing piece 72. The slope 88 serves as a guide member for guiding the intake air I.

In the practice of the embodiment now under discussion, the slope 88 has an upstream edge (on the side adjacent to the introducing passage 69) and a downstream edge (on the side adjacent to the cleaner chamber 28) which have different angles of inclination for the guidance of the intake air I. More specifically, a smooth connection with the introducing passage 69 occurs on the upstream side of the slope 88 whereas a smooth connection with an outer peripheral surface of the cylindrical first guide member 46 occurs on the downstream side of the slope 88. In other words, the slope 88 is of such a design as to bring about a swirling force on the intake air I then being introduced from the introducing passage 69 into the cleaner chamber 28. It is, however, to be noted that the use of the slope 88 may not be essential and necessary.

As shown in FIG. 5, the other end portion of the cleaner chamber 28 is formed with a dust discharge opening 90. Specifically, the dust discharge opening 90 is formed at a location on an outer side (the other end side) of the filter element 30 in the cleaner chamber 28 in the axial direction C1. This dust discharge opening 90 is provided at the other end portion of the element accommodating portion 24 of the fan casing 18 and forwardly of the center axis C1. In the practice of the embodiment now under discussion, the dust discharge opening 90 is in the form of a rectangular opening. The dust discharge opening 90 is used to discharge dusts DU within the cleaner chamber 28 to a dust discharge passage 92.

The rectangular dust discharge opening 90 has an upstream edge 90a and a downstream edge 90b both extending in the axial direction C1 of the filter element 30. This dust discharge opening 90 also has opposite side edges 90c and 90c both extending in a direction perpendicular to the axial direction C1. The upstream edge 90a is positioned on the upstream side of the air discharged from the dust discharge opening 90, and the downstream edge 90b is positioned on the downstream side thereof. In the practice of the embodiment now under discussion, the upstream edge 90a is positioned at a location closer to the center axis C1 rather than the downstream edge 90b. In other words, the downstream edge 90b is positioned above the upstream edge 90a.

A dust discharge pipe 94 is formed in the element accommodating portion 24 of the fan casing 18. The dust discharge pipe 94 forms the dust discharge passage 92 communicated with the dust discharge opening 90. The dust discharge pipe 94 is in the form of a cylindrical pipe and protrudes forwards from the element accommodating portion 24 of the fan casing 18. Specifically, as shown in FIG. 1, the dust discharge pipe 94 extends inclined downwardly towards the front from the other end portion of the element accommodating portion 24. In the practice of the embodiment now under discussion, the dust discharge pipe 94 is formed integrally with the element accommodating portion 24. The dust discharge pipe 94 shown in FIG. 5 has an inner diameter Di so chosen as to be larger than the longitudinal dimension L1 (axial dimension) of the dust discharge opening 90.

Figure 3B:
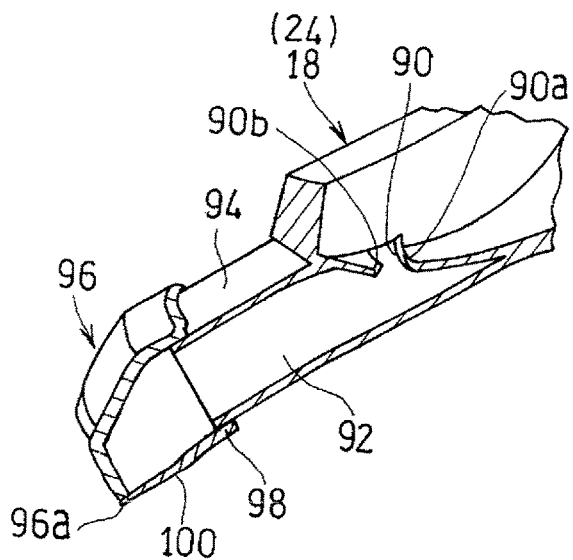
FIG. 3B is a longitudinal sectional view with a portion of FIG. 3A shown on an enlarged scale.

The dust discharge pipe 94 has an outlet 94a defined at a front end thereof, and a one-way valve 96, best shown in FIG. 3A, is fitted to the outlet 94a. In the practice of the embodiment now under discussion, the one-way valve 96 is employed in the form of a duckbill shaped valve. As shown in FIG. 3B, the one-way valve 96 employed in the practice of the embodiment now under discussion includes a bearing portion 98 provided in one side portion of the inside and a lid member 100 pivotable about the bearing portion 98.

The lid member 100 forming a part of the one-way valve 96 selectively opens and closes in response to pressure fluctuation taking place during the operation of the engine. While the lid member 100 is in a closed positon, the dust DU is accumulated within the interior of the one-way valve 96. On the other hand, when the lid member is in an opened positon, the dust DU within the interior of the one-way valve 96 is discharged by the effect of the pressure fluctuation. In the practice of the embodiment now under discussion, in order to effectively discharge the dusts DU, the outlet 96a of the one-way valve 96 is oriented downwards. The dust DU flowing from the dust discharge opening 90 into the dust discharge passage 92 within the dust discharge pipe 94 is discharged to the outside through the one-way valve 96.

Procedures for replacing the filter element 30 employed in the practice of the embodiment now under discussion will now be described. The cleaner casing 26 is removed after the fixture pieces 25 shown in FIG. 2 have been loosened. When the cleaner casing 26 is so removed, the filter element 30 is brought in a condition with the retention of the other end side released as shown in FIG. 4. Starting from this condition, the filter element 30 is pulled towards the other end side, followed by pulling from the first guide member 46 on one end side as shown in FIG. 8 to thereby release the retention of the first retaining portion 36 of the filter element 30. In this manner, the filter eminent 30 is removed from the engine E.

Subsequently, a new filter element 30 or the filter element 30 which has been cleaned is fitted. At the outset, the filter element 30 shown in FIG. 4 is placed within the element accommodating portion 24 of the fan casing 18 and is moved towards the one end side so that the filter element 30 can be retained by the first guide member 46. Specifically, as shown in FIG. 8, the insertion pipe 50 of the first guide member 46 is inserted into the opening 36a in the first retaining portion 36 of the filter element 30 and, at the same time, the first retaining portion 36 of the filter element 30 is retained by the retaining portion 48 of the element accommodating portion 24 from radially outwards. At this time, the end surface of the first retaining portion 36 of the filter element 30 is brought into contact with the end surface of the positioning portion 52 of the element accommodating portion 24. The axial position of the filter element 30 is thus regulated. By so doing, one end portion of the filter element 30 comes to be retained by the element accommodating portion 24.

Also, the cleaner casing 26 is placed from above onto the fan casing 18 shown in FIG. 11, and, by fastening the fixture pieces 25, the cleaner casing 26 is fitted to the fan casing 18. By so doing, the second retaining portion 38 in the other end side of the filter element 30 shown in FIG. 8 comes to be retained from above and below (from radially outwards) by the lower guide piece 58 of the fan casing 18 and the upper guide piece 62 of the cleaner casing 26. In the manner described above, the filter element 30 is fitted to the engine E.

The flow of the intake air I for the engine E in the practice of the embodiment now under discussion will be discussed. Upon start of the operation of the engine E shown in FIG. 1, a negative pressure is developed inside an intake passage, and the intake air I is consequently supplied to the engine E. The intake air I referred to above flows into the introducing passage 69 through the suction opening 66 shown in FIG. 11. At this time, the dust including chopped grasses is removed by the screen 68. The intake air I thus flowing into the introducing passage 69 flows within the introducing passage 69 in a direction towards the one end portion thereof.

The intake air I within the introducing passage 69 then flows from the communicating opening 86 at the one end portion into the cleaner chamber 28. At this time, the intake air I is guided by the slope 88 to form the swirling flow shown in FIG. 4. The intake air I flows, while being swirled, within the swirling passage 35 from the one end portion to the opposite end portion. During the flow of the intake air I within the swirling passage 35, the intake air I flows radially inwardly through the filter portion 40 of the filter element 30, shown in FIG. 8, into the hollow portion 30a of the filter element 30. At this time, the intake air I is cleansed or purified by the filter portion 40.

The intake air I, which has flown into the hollow portion 30a of the filter element 30, flows from the other end portion towards the one end portion of the hollow portion 30a and then flows into the hollow portion 50a of the insertion pipe 50 of the fan casing 18. The intake air I then flowing into the hollow portion 50a is supplied to the throttle body 57 of the cylinder units 6 and 6 from the cleaner outlet pipe 54, shown in FIG. 1, by way of the air intake pipe 56. This intake air I is, after the flow rate thereof within the throttle body 57 has been adjusted, mixed with fuel at a downstream side of the throttle body 57 before the air I is eventually supplied to the cylinder unit 6.

In the description that follows, the flow of the dust DU in the engine E in the practice of the embodiment now under discussion will be discussed. The finely divided dust DU, which has passed through the screen 68 shown in FIG. 10, flows into the cleaner chamber 28 together with the intake air I. The dust DU flowing into the cleaner chamber 28 flows, as shown in FIG. 8, from the one end portion towards the opposite end portion of the swirling passage 35 together with the intake air I. Since the dust DU is incapable of passing through the filter portion 40 of the filter element 30, the dust DU flows towards the other end portion of the cleaner chamber 28.

The dust DU is discharged from the dust discharge opening 90 in the other end portion of the cleaner chamber 28 into the dust discharge passage 92 defined in the dust discharge pipe 94 shown in FIG. 1. The dust DU within the dust discharge pipe 94 is subsequently discharged to the outside through the one-way valve 96.

According to the embodiment hereinabove fully described, the cleaner chamber 28 is formed between the fan casing 18 and the cleaner casing 26, and the cylindrical filter element 30 is accommodated within this cleaner chamber 28 as shown in FIG. 3A. Accordingly, in the practice of the embodiment now under discussion, the upper surface of the cleaner casing 26 and the upper surface of the fan covering 20 are held at the substantially same heightwise level. In this way, in the construction hereinabove described, despite the centrifugal air filter being used, an undesirable increase in height of the engine E can be suppressed. Also, since the air outside of the fan casing 18 is drawn into the swirling passage 35, the amount of the dust DU drawn can be reduced as compared with the case in which the air from the air cooling fan 16 is drawn. In addition, owning to the use of the centrifugal air filter, the dust DU is separated by the effect of the swirling flow, and the clogging of the filter element 30 can be suppressed. Also, since the suction opening 66 is oriented downwards, it is difficult to suck the dust around the engine. In view of this, the clogging of the filter element 30 is further suppressed.

In the top plan view as shown in FIG. 2, the filter element 30 is disposed between the pair of the cylinder heads 6 and 6. Accordingly, the filter element 30 can be disposed by the utilization of a space available between the pair of the cylinder heads 6 and 6. Accordingly, the undesirable increase in size of the engine E can be further suppressed.

As shown in FIG. 10, the screen 68 is mounted in the suction opening 66, and the introducing passage 69 is formed between the suction opening 66 and the cleaner chamber 28. Since the suction opening 66 is oriented downwards, the foreign matter removed by the screen 68 is apt to fall downwardly. Accordingly, it is possible to prevent the screen 68 from being occluded. Also, since the swirling flow is induced as it flows past the slope 88 in the introducing passage 69, the separation of the dust DU is facilitated within the swirling passage 35. As a result, the clogging of the filter element 30 is further suppressed.

The one end portion of the filter element 30 is covered from radially outwards by the retaining portion 48 of the first guide member 46 and is supported by the insertion pipe 50 of the first guide member 46. On the other hand, the other end portion of the filter element 30 is retained from radially outwards by the second guide member 65. A part of the swirling passage 35 referred to above is formed in the outer periphery of the retaining portion 48 of the first guide member 46 and the outer periphery of the second guide member 65. Accordingly, the intake air I can be smoothly guided from the one end portion to the other end portion of the filter element 30 within the swirling passage 35. As a result, the dust separation is facilitated by the effect of the swirling flow, and the possible clogging of the filter element 30 is hence further suppressed.

The one end portion of the filter element 30 is supported as inserted into the insertion pipe 50, and the other end portion of the filter element 30 is supported by the lower guide piece 58 of the fan casing 18 and the upper guide piece 62 of the cleaner casing 26. Accordingly, the selective removal and fitting of the filter element 30 is facilitated and, hence, the maintenance is improved.

As shown in FIG. 6, the projection 32 is formed in the fan casing side mating surface 24a of the fan casing 18, and the groove 34 for receiving the projection 32 therein is formed in the cleaner casing side mating surface 26a of the cleaner casing 26. Accordingly, it is possible to prevent the air from being sucked from the mating surfaces 24 and 26a. As a result, the stabilized flow of the intake air I within the swirling passage 35 shown in FIG. 3A can be obtained.

The other end portion of the cleaner chamber 28 shown in FIG. 8 is formed with the dust discharged opening 90 for the discharge of the dust DU within the cleaner chamber 28. Accordingly, the dust DU can be efficiently discharged from the dust discharge opening 90 that is formed in a portion where the swirling intake air I is decelerated. As a result, the dust DU will no longer accumulate within the cleaner chamber 28 and, therefore, the clogging of the filter eminent 30 is further suppressed.

As shown in FIG. 3B, the downstream edge 90b of the dust discharge opening 90 assumes a position above the upstream edge 90a, and the dust discharge passage 92 has a passage surface area that is sufficiently larger than the opening surface area of the dust discharge opening 90. According to this construction, it is possible to avoid an undesirable reverse flow of the dust DU from the dust discharge passage 92.

As shown in FIG. 1, the one-way valve 96 is fitted to the outlet 94a of the dust discharge pipe 94. Accordingly, the reverse flow of the dust DU is prevented. Also, even where the dust DU exceeding the discharge capability of the one-way valve 96 is discharged into the dust discharge pipe 94, the dust DU can be discharged by little and little from the one-way valve 96 after the dust DU has been accumulated within the dust discharge pipe 94. Accordingly, the operation of the one-way valve 96 is stabilized. In addition, since the outlet 96a of the one-way valve 96 is oriented downwardly, the dust DU can fall downwardly from the outlet 96a of the one-way valve 96 by the effect of its own weight. Hence, the capability of discharge of the dust DU improves.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, the air filter structure designed according to the present invention is suitably employed in an engine of the machine that is used under the environment full with dusts such as, for example, the lawn mower, but the present invention is not necessarily limited thereto and can be employed in any general purpose engine.

Accordingly, such changes and modifications are, unless they depart from the scope of the present invention as delivered from the claims annexed hereto, to be construed as included therein.

REFERENCE NUMERALS

10 . . . Cylinder head
16 . . . Air cooling fan
18 . . . Fan casing
24a . . . Fan casing side mating surface 26 . . . Cleaner casing
26a . . . Cleaner casing side mating surface
28 . . . Cleaner chamber
30 . . . Filter element
30a . . . Hollow portion in the filter element
32 . . . Projection
34 . . . Groove
35 . . . Swirling passage
46 . . . First guide member
50 . . . Inserted pipe (Pipe)
58 . . . Lower guide piece (Guide piece)
62 . . . Upper guide piece (Guide piece)
65 . . . Second guide member
66 . . . Suction opening
68 . . . Screen
69 . . . Introducing passage
90 . . . Dust discharge opening
90a . . . Upstream edge of the dust discharge opening
90b . . . Downstream edge of the dust discharge opening
92 . . . Dust discharge passage
94 . . . Dust discharge pipe
96 . . . One-way valve
96a . . . Outlet of the one-way valve
E . . . Engine

What is claimed is:

1. An air filter structure for a general purpose engine, which comprises:
    a fan casing to cover an air cooling fan for the engine;
    a cleaner casing fitted to the fan casing to define a cleaner chamber therebetween;
    a filter element of a cylindrical configuration accommodated within the cleaner chamber and configured to purify air which will be used as an engine intake air; and
    a swirling passage defined in an outer periphery of the filter element within the cleaner chamber and configured to pass the air into a hollow portion of the filter element while the air is swirled around the filter element, wherein a suction opening is provided for introducing air outside the fan casing into the swirling passage, wherein the fan casing includes a fan housing portion for covering the air cooling fan, and a rear wall that divides the cleaner chamber from an interior space in the fan housing portion of the fan casing and that prevents air induced by the air cooling fan from flowing into the cleaner chamber.

2. The air filter structure for the general purpose engine as claimed in claim 1, wherein
    the engine is a vertical two cylinder engine, and
    the filter element, when viewed in a planar view, is disposed between a pair of cylinder heads.

3. The air filter structure for the general purpose engine as claimed in claim 1, wherein the suction opening is oriented downwardly.

4. The air filter structure for the general purpose engine as claimed in claim 3, further comprising:
    a screen fitted to the suction opening and configured to remove foreign matter; and
    an introducing passage formed outside the cleaner chamber and configured to introduce the air, which has passed through the screen, into one end portion of the cleaner chamber and then providing the air with swirling flow.

5. The air filter structure for the general purpose engine as claimed in claim 1, further comprising:
    a first retainer having a retaining portion configured to retain a first end portion of the filter element from radially outwards to form a portion of the swirling passage in an outer periphery of the first end portion of the filter element and;
    a second retainer having a pair of guide pieces configured to retain a second end portion of the filter element from radially outwards to form a portion of the swirling passage in an outer periphery of the second end portion of the filter element.

6. The air filter structure for the general purpose engine as claimed in claim 5, wherein:
    the first retainer comprises a pipe formed integrally with one of the fan casing and the cleaner casing, the first end portion of the filter element being inserted into the pipe in an axial direction of the filter element; and
    the pair of guide pieces fit respectively to the fan casing and the cleaner casing, the guide pieces supporting the second end portion of the filter element from a radial direction of the filter element.

7. The air filter structure for the general purpose engine as claimed in claim 1, wherein:
    the fan casing has a fan casing side mating surface defined therein and the cleaner casing has a cleaner casing side mating surface defined therein, the fan casing and the cleaner casing contacting with each other at a butting area between the fan casing side mating surface and the cleaner casing side mating surface, and;
    a projection is formed in one of the fan casing side mating surface and the cleaner casing side mating surface, and a groove engageable with the projection is formed in the other of the fan casing side mating surface and the cleaner casing side mating surface.

8. The air filter structure for the general purpose engine as claimed in claim 1, wherein:
    the air flows within the cleaner chamber from one end portion towards another end portion; and
    a dust discharge opening for discharging dust within the cleaner chamber into a discharge passage is formed axially outwardly of the filter element at the other end portion of the cleaner chamber.

9. The air filter structure for the general purpose engine as claimed in claim 8, wherein:
    the dust discharge opening has an upstream edge, which is positioned on an upstream side of the air discharged from the dust discharge opening, and a downstream edge positioned on a downstream side thereof;
    the upstream edge and the downstream edge both extend in an axial direction of the filter element; and
    the downstream edge is positioned above the upstream edge.

10. The air filter structure for the general purpose engine as claimed in claim 8, further comprising a dust discharge pipe fluid connected with the dust discharge opening, the dust discharge pipe defining the discharge passage therein; and
    a one-way valve fitted to an outlet of the dust discharge pipe.

11. The air filter structure for the general purpose engine as claimed in claim 10, wherein the one-way valve has an outlet opening oriented downwardly.

12. The air filter structure for the general purpose engine as claimed in claim 7, further comprising a stripe sealing member mounted in the groove.

13. The air filter structure for the general purpose engine as claimed in claim 1, further comprising:
    an introducing passage formed between the suction opening and the cleaner chamber;

a communicating port is formed at one end portion of the introducing passage, the communicating port being communicated with one end portion the cleaner chamber; and a slope is provided in the communicating port, the slope serving as a guide member for guiding the intake air and bring about a swirling force on the intake air, wherein the slope has an upstream edge and a downstream edge which have different angles of inclination for the guidance of the intake air.

14. The air filter structure for the general purpose engine as claimed in claim 8, wherein the dust discharge passage has a passage surface area that is larger than an opening surface area of the dust discharge opening.

* * * * *